(12) United States Patent
Dolan et al.

(10) Patent No.: US 6,535,138 B1
(45) Date of Patent: Mar. 18, 2003

(54) HVAC NETWORK VERIFICATION SYSTEM

(75) Inventors: Robert P. Dolan, Syracuse, NY (US); Thomas R. Phillips, Cicero, NY (US); Thomas L. DeWolf, Liverpool, NY (US); Graham Wright, Bexleyheath (GB)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 08/738,157

(22) Filed: Oct. 25, 1996

(51) Int. Cl.[7] .................................................. G08B 5/36
(52) U.S. Cl. .................. 340/815.47; 340/298; 340/502; 340/635; 340/815.4
(58) Field of Search ........................ 340/815.47, 438, 340/644, 825.44, 825.47, 825.35, 825.49, 539, 521, 635, 815.4, 298, 825.06, 502; 364/505

(56) References Cited

U.S. PATENT DOCUMENTS 4,497,031 A * 1/1985 Froehling et al. ........... 364/505
5,086,385 A * 2/1992 Launey et al. .............. 364/188
5,198,809 A * 3/1993 Day ....................... 340/825.16
5,233,247 A * 8/1993 Dahl et al. ............. 340/825.68
5,291,190 A * 3/1994 Scarola et al. ......... 340/825.06
5,530,896 A   6/1996 Gilbert ....................... 395/829

FOREIGN PATENT DOCUMENTS

| EP | 62102053 | 12/1987 |
| EP | 2017348 | 1/1990 |
| EP | 651303 A1 | 3/1995 |
| EP | 8205251 | 9/1996 |

\* cited by examiner

*Primary Examiner*—Jeffery Hofsass
*Assistant Examiner*—Davetta W. Goins
(74) *Attorney, Agent, or Firm*—William F. White

(57) ABSTRACT

A system for verifying the operability of one or more HVAC devices in a communication network includes a network control device that sends a particular type of message to the HVAC devices. Each HVAC device receiving the message will initiate a clearly visible display on the HVAC device if the message is appropriately processed within the receiving HVAC device. Each HVAC device may be visually checked to confirm that it is in fact responding to the message from the network control device.

30 Claims, 7 Drawing Sheets

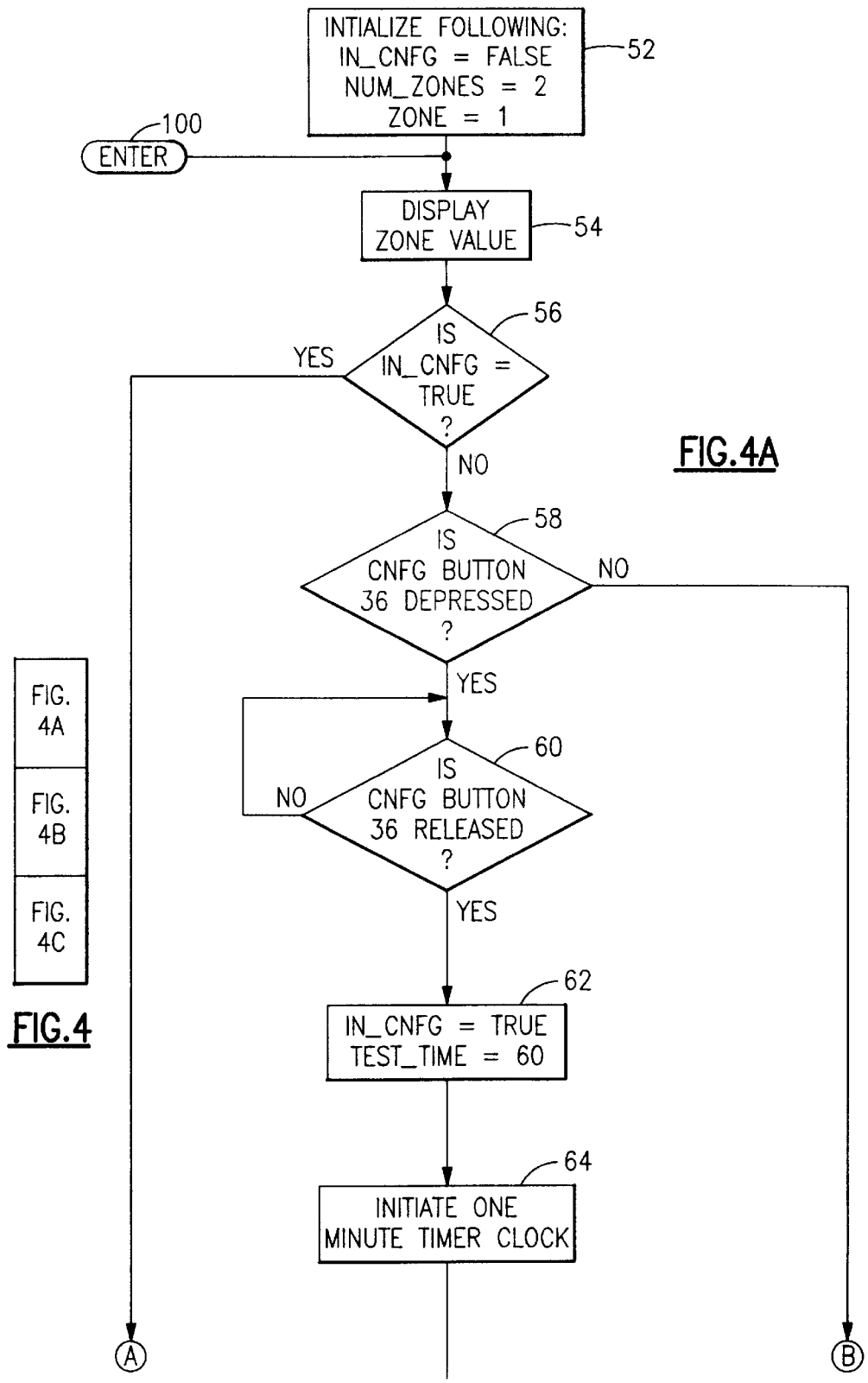

HVAC NETWORK VERIFICATION SYSTEM

BACKGROUND OF THE INVENTION

This invention relates to verifying the operability of one or more heating, ventilating, and air conditioning devices (HVAC devices) within a communication network. In particular, this invention relates to verifying that such HVAC devices have been properly installed or repaired in such a network.

The installation or repair of one or more HVAC devices within a communication network usually includes conducting one or more tests of the installed or repaired devices to ascertain whether the devices are capable of receiving and responding to network communications. This testing procedure can be time consuming when a number of devices are to be individually tested. The testing procedure can be furthermore complicated when each device has its own unique test. Testing procedures following installation or repair of HVAC devices in a communications network may also often require individually addressing the devices that are to be checked for proper communication operation. It is possible under such a testing procedure to successfully communicate with a particularly addressed device that is in fact not one of the devices that was either installed or repaired. This can occur when the address used in the test procedure is not in fact the network address of the installed or repaired device.

OBJECTS OF THE INVENTION

It is an object of the invention to provide a network communication system, which allows for an efficient and expeditious verification of the communications capability of one or more HVAC devices connected to the network.

It is another object of the invention to verify the communication capability of a number of HVAC devices in a communication network without individually addressing each device.

SUMMARY OF THE INVENTION

The above and other objects of the invention are achieved by providing an HVAC communication network with the ability to identify all HVAC devices that are to operate in a particular zone of a building or a series of buildings. The locations of all such HVAC devices are known to the person or persons wishing to verify the operability of these HVAC devices. In accordance with the invention, a message is sent to all such devices requiring each device to begin displaying a visible signal. The signal is preferably the flashing of a series of light emitting diodes on a panel of each such HVAC device. The flashing LEDs are easily visible to a person wishing to check such a visible display in the location where the HVAC device has been installed. In accordance with the invention, the person performing the visual check may terminate the message being sent to all such devices after performing the visual check. In accordance with another aspect of the invention, the message is automatically terminated after a predetermined period of time in the event that it is not terminated by the person or person performing the visual check. In accordance with still another aspect of the invention, appropriate messages may be sent to more than one zone.

BRIEF DESCRIPTION OF THE DRAWINGS

Other objects and advantages of the present invention will be apparent from the following description in conjunction with the accompanying drawings, in which:

FIGS. 4A through 4C illustrate a process executable by the processor of FIG. 2 for establishing communication with a designated group of the HVAC devices of FIG. 1.

DESCRIPTION OF THE PREFERRED EMBODIMENT

Figure 1:
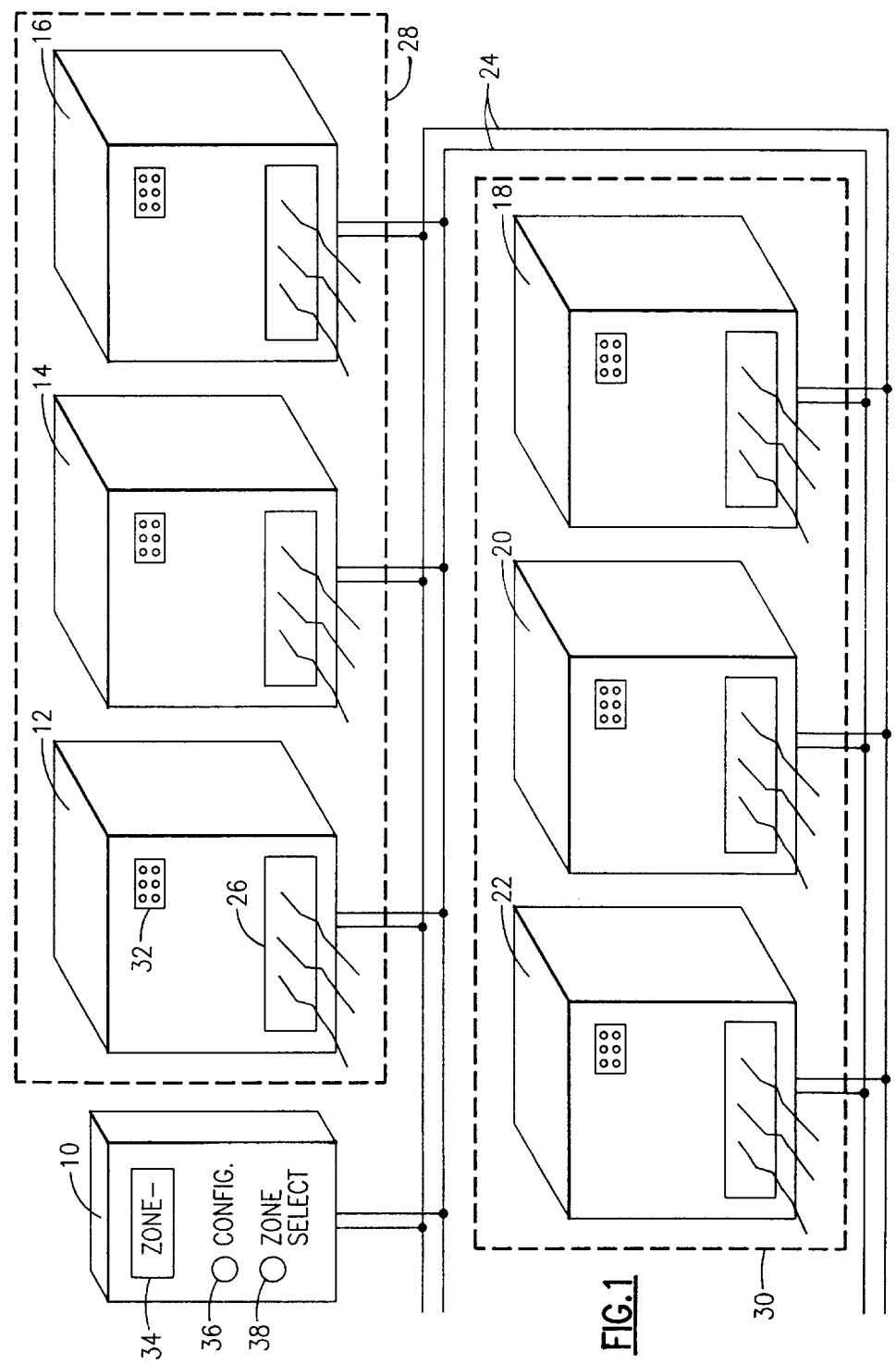
FIG. 1 illustrates a plurality of HVAC devices each connected via a network communication bus to a network control device.

Referring to FIG. 1, a network control device 10 is connected to HVAC devices 12, 14, 16, 18, 20 and 22 via a communication bus 24. The communication bus 24 is preferably a two wire bus requiring an appropriate two wire connection to the bus from each HVAC device. It is to be appreciated that one or more of the HVAC devices may not be properly connected to the two wires of the communication bus 24. This could occur if the two wires of a particular two wire connection are transposed before being connected to the two wires of the communication bus 24.

The HVAC device 12 will be located in a particular part of a building so as to provide conditioned air through a ventilated opening 26 to that particular building location. In a similar fashion, the HVAC devices 14 through 22 will provide conditioned air through respective ventilated openings in their particular building locations. These building locations are preferably grouped into different zones of controlled heating and/or cooling. In this regard, HVAC devices 12, 14 and 16 are preferably located in a particular zone of heating or cooling labeled 28. The locations of HVAC devices 18, 20 and 22 are similarly grouped into another zone of heating and/or cooling denoted as zone 30. The physical locations of each HVAC device within its respective zone is available to a person wishing to check these particular HVAC devices.

Each HVAC device is seen to include a panel of light emitting diodes (LEDs) such as the LED panel 32 for HVAC device 12. Each of these LED panels is of a sufficient size and brilliance to be easily noted by one visually checking the panels of these devices in the locations wherein the HVAC devices have been installed.

Zone control information for each HVAC control device connected to the communication bus 24 is normally provided by the network control device 10. The network control device 10 is seen to include a display 34 as well as a config button 36 and a zone select button 38. As will be explained hereinafter, a person operating the network control device 10 can cause a configuration routine to be executed upon depression of the config button 36. The configuration routine will be performed for the particular zone displayed on the display panel 34. The particular zone is selected by depressing the zone select button 38.

Figure 2:
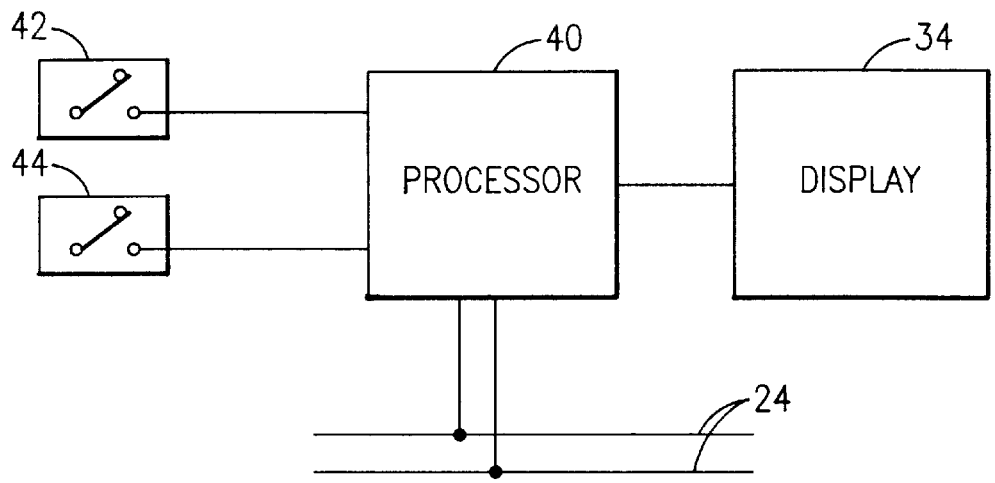
FIG. 2 illustrates the network control device in further detail including a processor connected to the communication bus of FIG. 1.

Referring now to FIG. 2, the internal configuration of the network control device 10 is schematically illustrated. A processor 40 within the network control device is operative to receive or transmit information on the communication bus 24. The processor is also responsive to a config button circuit 42 and a zone select button circuit 44. The processor 40 is also operative to send particular messages to the display panel 34 for viewing by a person wishing to note the status of the network control device.

Figure 3:
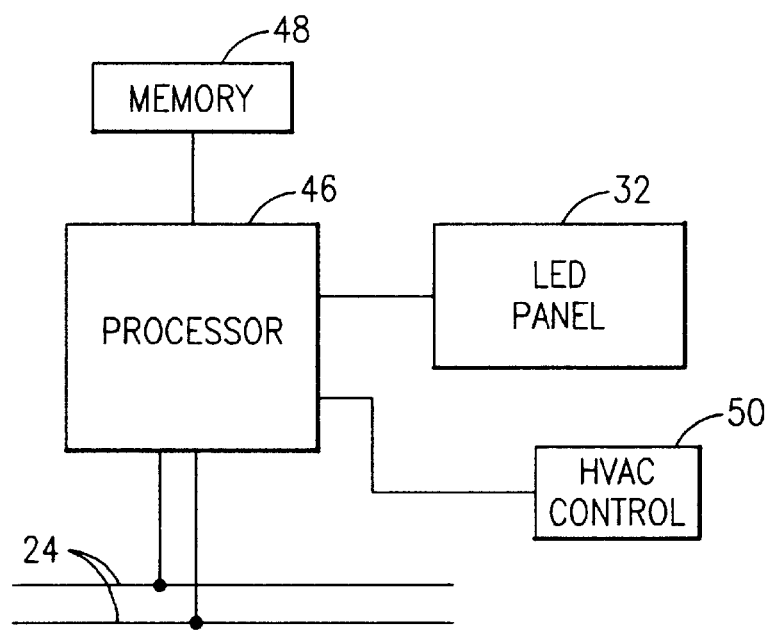
FIG. 3 illustrates a particular HVAC device having a processor connected to the communication bus of FIG. 1.

Referring now to FIG. 3, the internal configuration of an HVAC device such as HVAC device 12 is illustrated. The HVAC device 12 is seen to include a processor 46 having a memory 48 associated therewith. The processor 46 is operative to receive messages over the communication bus 24 and store the messages in a memory 48 for further analysis. The processor 46 is also connected to the LED control panel 32 as well as to an HVAC control circuit 50 which normally controls the local operation of the heating, ventilating and air conditioning functions performed by the HVAC device 12.

Referring to FIG. 4A, the software residing within the processor 40 when executing a configuration routine is shown in detail. This software begins with a step 52 wherein certain software variables are first initialized any time the processor 40 is initially powered up. A software variable IN_CNFG is set equal to false whereas a software variable NUM_ZONES is set equal to two and a software variable ZONE is set equal to one. The IN_CNFG variable is an indication as to whether or not the processor 40 is in a configuration mode or not. The NUM_ZONES variable is indicative of the number of zones present on the communication network of FIG. 1. As has been previously noted, there are two zones illustrated in FIG. 1. The ZONE variable is used as an identifier of one particular zone in FIG. 1. For instance, the zone value of one indicates the zone 28 whereas a zone value of two identifies zone 30 in FIG. 1.

Upon initializing the above variables, the processor 40 proceeds to a step 54 and authorizes the display of the present value of the ZONE variable on display 34. This provides an indication to anyone viewing the display 34 as to which of the zones on the communication bus is currently available for the possible execution of the configuration routine of FIGS. 4A through 4C. The processor 40 proceeds from step 54 to a step 56 and inquires as to whether the IN_CNFG variable is equal to true. Since this variable will have initially been set equal to false, the processor will proceed to a step 58 and inquire as to whether the config button 36 is depressed. This will be accomplished by checking the status of the config button circuit 42 in FIG. 2. In the event that the config button 36 has been depressed, the processor 40 will proceed to a step 60 and inquire as to whether the config button 36 has thereafter been released. It is to be noted that the processor will continue to inquire as to whether the config button 36 has been released by continuing to loop back through the no path until the config button circuit 42 indicates such a release of the config button. At this time, the processor 40 will proceed to a step 62 and set the IN_CNFG variable equal to true. The processor will also set a variable TEST_TIME equal to 60. The IN_CNFG variable being set equal to true will be an indication that the network control device has been asked to proceed to a configuration mode. The TEST_TIME variable of 60 will be used hereinafter to set up a particular time in which a verification test is to be performed during the configuration mode.

The processor 40 now proceeds to initiate a one minute timer clock in a step 64. The one minute timer clock will preferably be a clock routine which counts up to one minute. The clock routine value can be read at any point in time by the processor 40 executing the program of FIGS. 4A through 4C. The processor next proceeds in a step 66 to set certain variables equal to particular values in preparation for sending a message to each HVAC device on the communication bus 24. Referring to step 66, the first variable MSG_TYPE is set equal to a particular verify code. This code will have particular significance to the HVAC devices receiving the message. The processor 40 will also set CNFG_TIME equal to zero. The variable CHECK_CNFG will be set equal to true whereas the variable DESTN_ADDR will be set equal to the present value of the ZONE variable, which is one. The processor 40 will proceed to step 68 and prepare a "verify" message for transmittal to the HVAC devices 12 through 22. As has been previously noted, this message will include the values of the variables discussed in step 66. It is to be appreciated that these values will preferably appear in various fields of information in the particular message. For instance, the first field of information may be an encoded byte set aside for identifying the type of message, which would be the binary coding that would be interpreted by the receiving device as an indication of a verify message. In a similar fashion, the values for CNFG_TIME, CHECK_CNFG and DESTN_ADDR would be appropriately set forth in identifiable fields of information to be read and understood by the receiving HVAC device. The processor proceeds to actually send the verify message over the communication bus 24 in a step 70.

The processor 40 proceeds after having sent the verify message in step 70 to a step 72 to inquire as to whether the config button 36 is again depressed. Assuming that the config button 36 has not been depressed, the processor will proceed to a step 74 and read the one minute timer clock previously initiated in step 64. The processor inquires whether one minute has elapsed on the minute timer clock 76. In the event that one minute has elapsed, the processor proceeds in a step 78 to reset the one minute timer clock before setting the variable TEST_TIME equal to test time minus one. Since test time was initially set equal to sixty in step 62, the test time will be decremented to fifty-nine following expiration of the first one minute. Referring to step 76, it is to be noted that in the event that the one minute timer clock has not expired the processor will proceed along the no path out of step 76 to a step 82, which will also be encountered immediately by the processor proceeding out of step 80. Referring to step 82, the processor inquires whether test time is equal to zero. In the event that the value of the TEST_TIME variable is not yet zero, the processor will proceed to step 84 and inquire as to whether the zone select button 38 has been depressed. In the event that the zone select button 38 has been depressed, the processor will proceed to a step 86 and inquire as to whether the zone select button 38 has been released. The processor will merely loop around step 86 until such action is noted. It is to be appreciated that the zone select button 38 will normally have been depressed and thereafter released when a person operating the zone select button wishes to change the zone to be configured. The processor will proceed to step 88 and increment the value of the ZONE variable by one. The processor will also set the TEST_TIME variable equal to sixty. The processor next proceeds to reset the one minute timer clock so as to allow the timer clock to again begin to clock out one minute of time. The processor proceeds from step 90 to a step 92 and inquires as to whether the value of the zone variable is greater than NUM_ZONES. It will be remembered that NUM_ZONES is equal to two. In the event that the value of ZONE is two, the processor will proceed along the no path to an exit step 94. Referring again to step 92, in the event that the value ZONE is greater than two, the processor will proceed to a step 96 and reset the value of zone to one before exiting in exit step 94.

Figure 4B:
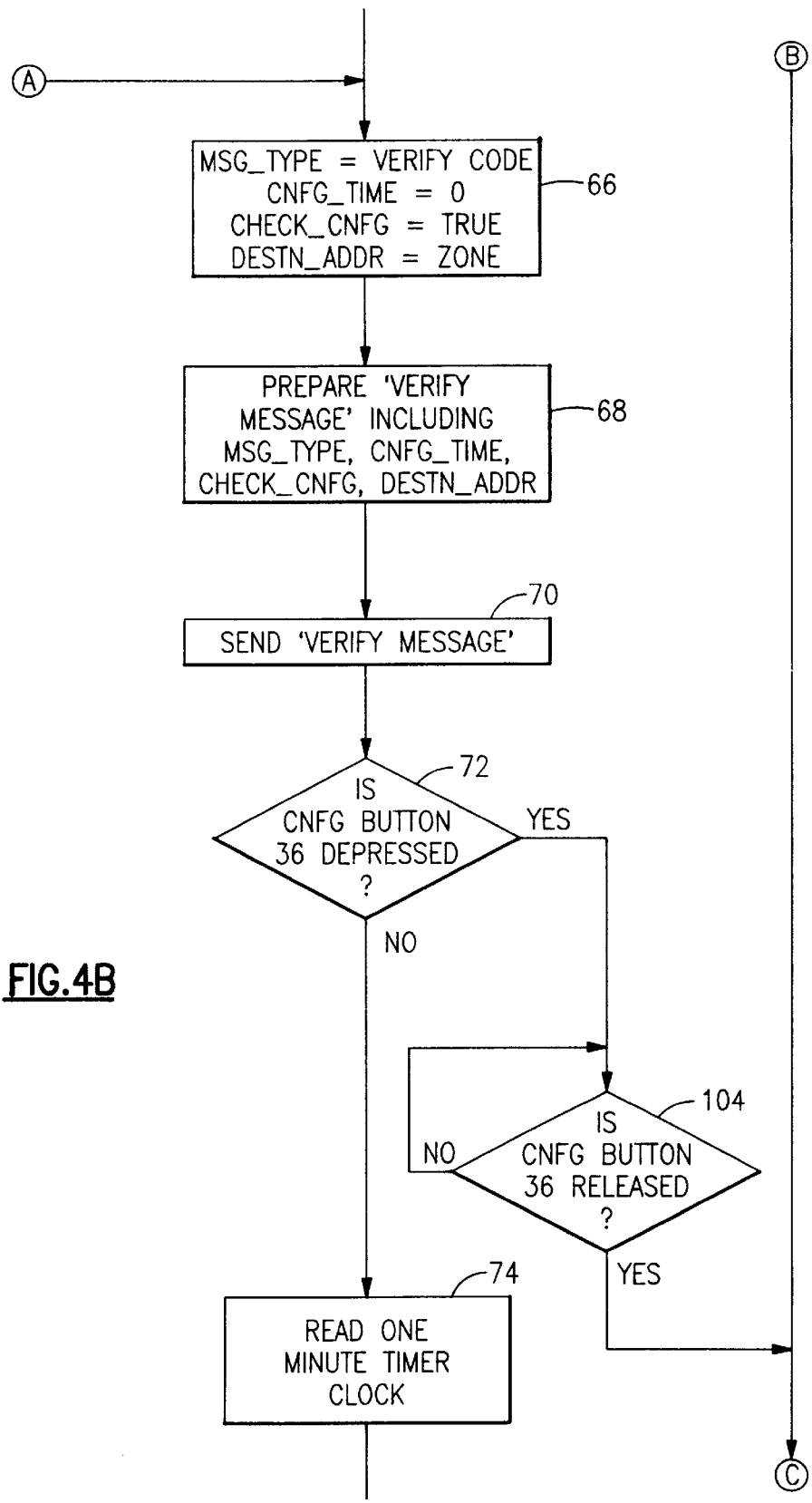
Figure 4C:
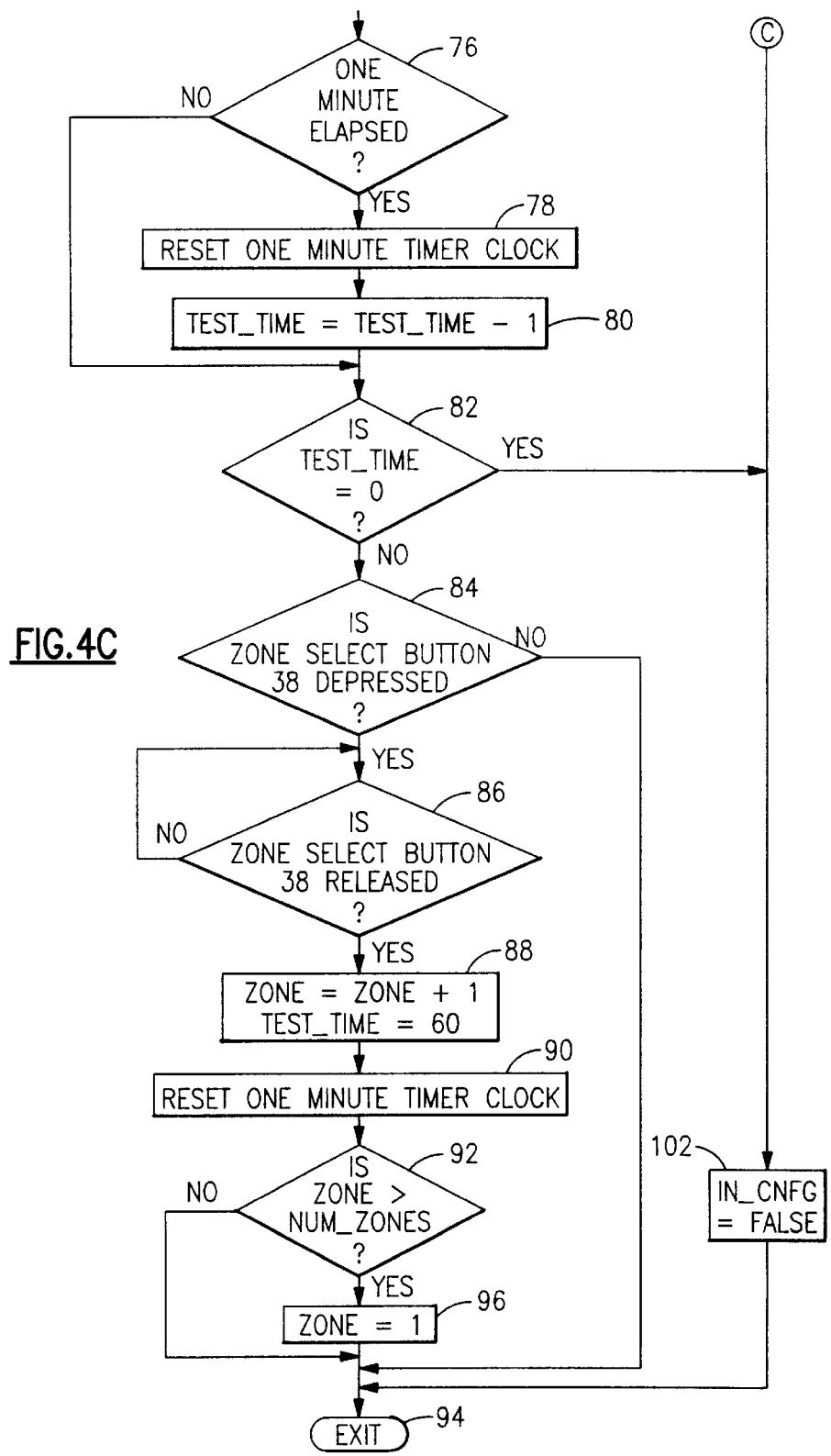

It is to be appreciated that the processor will proceed to execute a number of other functions for which it has been programmed before again returning to the entry point of the software program of FIGS. 4A through 4C denoted as step 100. At this time, the processor will display the present value of the ZONE variable in step 54. It will be remembered that the present value of the ZONE variable will be two when the ZONE variable has been so incremented in a step 88 following a noted depression and release of the zone select button 38 in steps 84 and 86. It is to be appreciated that very little real time will have elapsed between exiting the software of FIGS. 4A through 4C and the next execution of the software. There will hence be no perceptible delay in the display of the zone currently being subject to the configuration process.

The processor will again check for whether the IN_CNFG variable is equal to true in step 56. This value should still be true as a result of having been previously set equal to true in step 62 when the config button 36 was first noted as being depressed and released. The processor will hence exit from step 56 along the yes path to step 66. Referring to step 66, the processor will now define values for the denoted variables MSG_TYPE, CNFG_TIME, CHECK_CNFG and DESTN_ADDR. It is to be noted that in this particular case the DESTN_ADDR will be equal to a zone value of two rather than a zone value of one. The processor proceeds in step 68 to prepare a verify message including the aforementioned variables and to send such a verify message over the communication bus 24 in step 70. As will be explained in detail hereinafter, this particular verify message will be noted for further processing in the HVAC devices 18 through 22, which comprise zone two.

The processor proceeds again to step 72 and inquires as to whether the config button 36 has been depressed. It is to be appreciated that this button will not usually be depressed for several minutes since the person originally depressing the button will want to visually check the HVAC devices receiving and processing the verify message. This will mean that the processor will be proceeding through steps 74, 76, 78 and 80 to decrement the value of test time each time the one minute timer clock has elapsed. As long as the test time has not been decremented to zero, the processor will proceed to inquire as to whether the zone select button has been depressed. The zone select button 38 will normally not be so depressed prompting the processor to proceed along the no path out of step 38 to the exit step 94.

It is to be appreciated that at some point the test time may be decremented to zero prompting the processor to exit from step 82 via the yes path to a step 102 wherein IN_CNFG will be set equal to false before proceeding to exit step 94. It is also to be appreciated that the config button 36 may be depressed at some point in time before the test time is equal to zero. This will be detected in a step 72 prompting the processor to proceed to a step 104 to inquire whether the config button 36 has been released. When the config button is released, the processor will proceed to step 102 and again set IN_CNFG equal to false. It is hence to be appreciated that the IN_CNFG variable will be set equal to false either as a result of the test time having expired or the processor noting that the config button 36 has been depressed and released. Following the occurrence of either event, the processor will in the next execution of the software of FIGS. 4A through 4C note in step 56 that the IN_CNFG variable is false. This will prompt the processor to inquire whether the config button 36 has been depressed in step 58. In the event that the config button 36 has not been depressed, the processor will proceed out of step 58 to step 102 and again set the IN_CNFG variable false before exiting in step 94. The processor will thereafter continuously execute steps 58, 100, 54, 56, 102 and 94 until such time as the config button 36 is depressed. This will suspend any further transmittal of verification messages to the respective zones until the config button 36 is again depressed.

Figures 5, 5A:
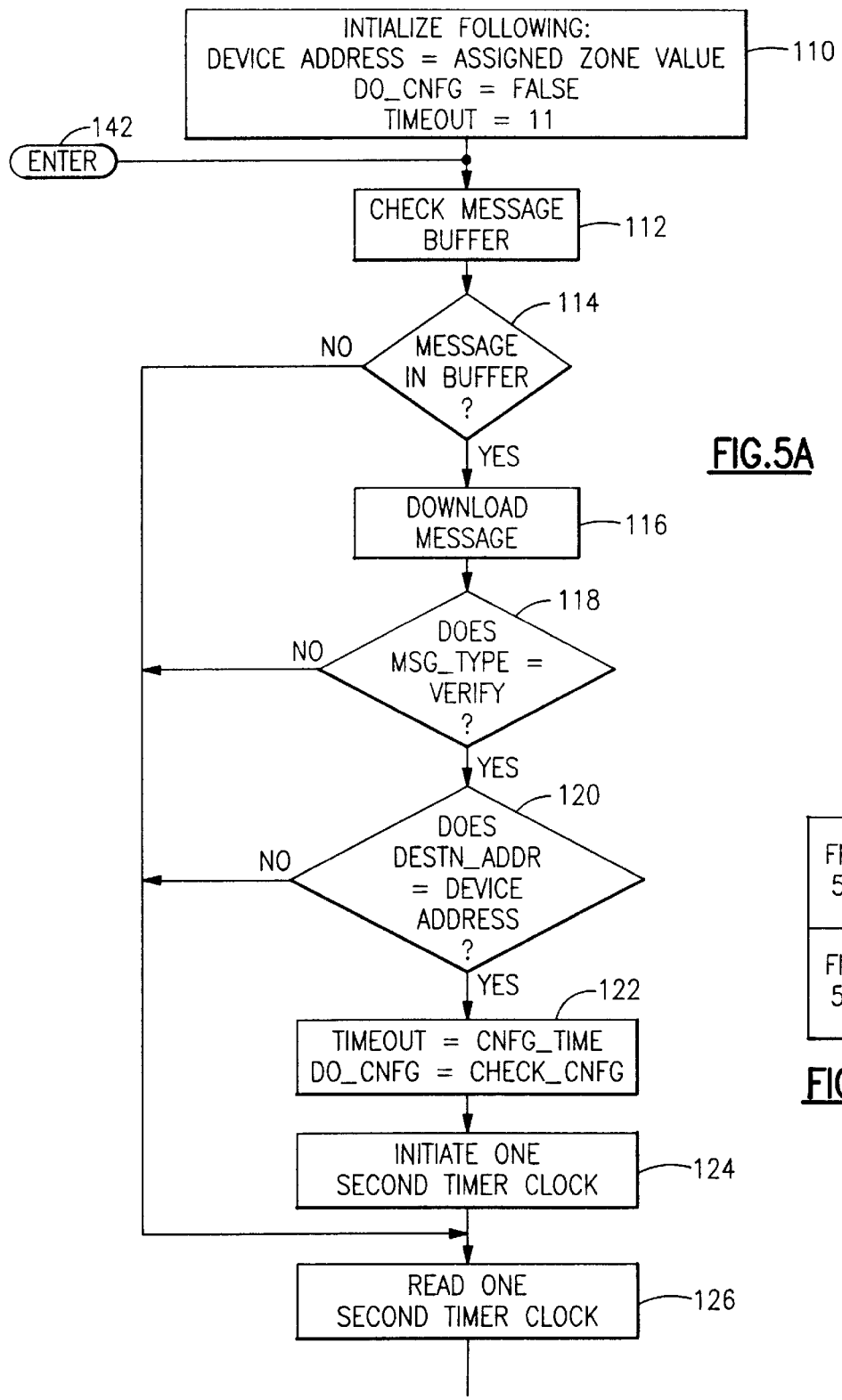
FIGS. 5 through 5B illustrate a process executable by each of the processors within the HVAC devices receiving the message generated in FIGS. 4A through 4C.

Referring to FIG. 5A, the software executable by the processor within each HVAC device connected to the communication bus 24 is illustrated. The software executable by each such processor begins with an initialization step 110 wherein a device address is defined. The device address will preferably be a particular zone value. In this regard, the HVAC devices 12, 14 and 16 will each have a device address of one whereas the HVAC devices 18, 20 and 22 will each have a zone address of two. The appropriate device address will have been previously stored in the particular memory associated with the processor of each HVAC device. For instance, memory 48 will contain the assigned value of one since the particular HVAC device 12 is in zone one. The memory 48 within the HVAC device 12 will also have stored a value for a variable DO_CNFG equal to false. Similarly, the memory 48 will have a stored value for a TIMEOUT variable that is equal to eleven.

Figure 5B:
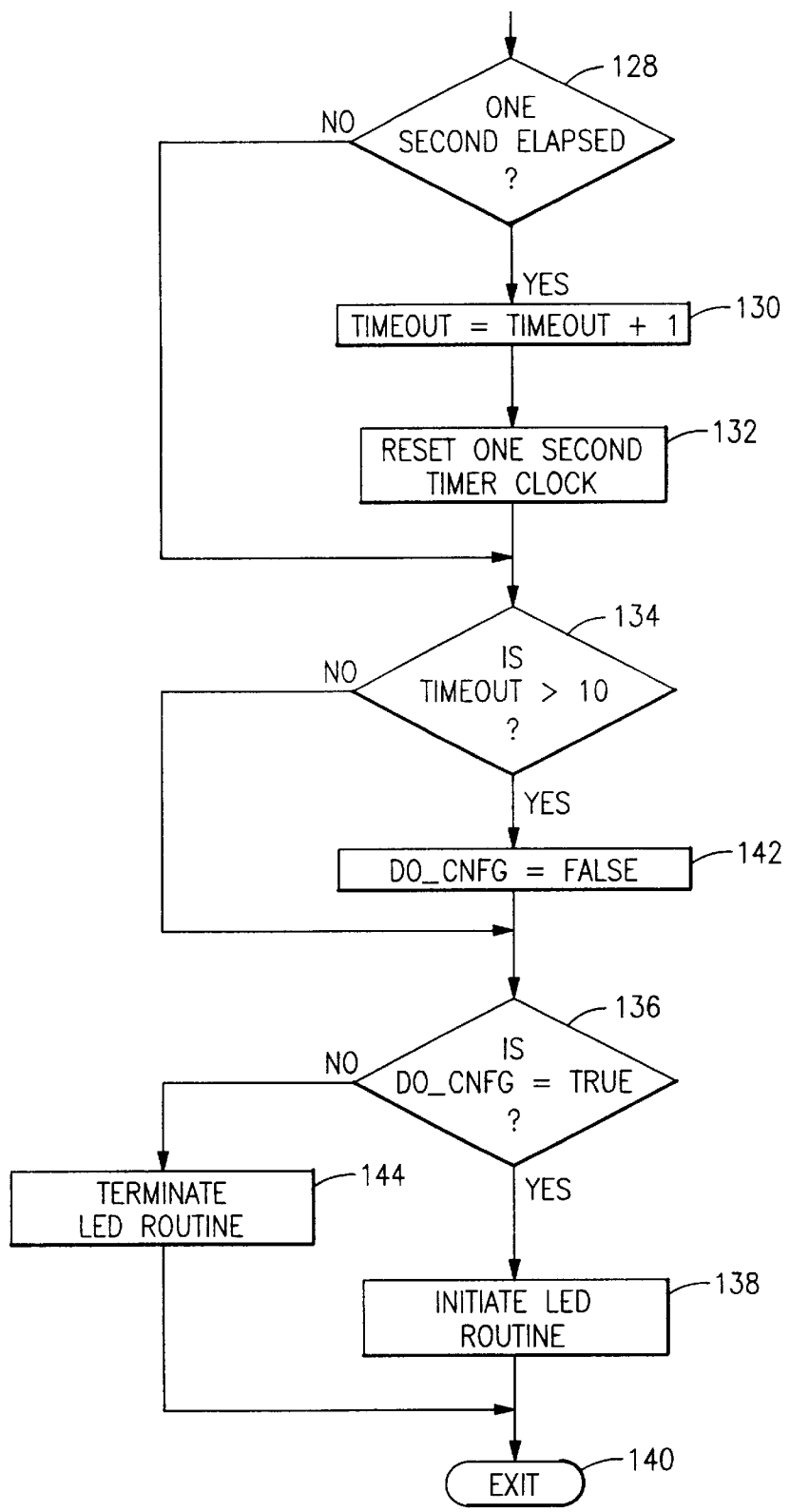

Following establishment of the value of the aforementioned variables, the processor will proceed to a step 112 and check a message buffer. It is to be appreciated that the processor 46 will in normal operation read any message on the communication bus 24 and store the same in a message buffer within memory 48. The processor will subsequently check the message buffer in step 112 while executing the process of FIG. 5. The processor will proceed from step 112 to a step 114 and inquire whether a message has been detected in the message buffer. In the event that a message has been detected, the processor will proceed along the yes path to a step 116 and download the message. The process will next inquire in a step 118 as to whether the MSG_TYPE field within the downloaded message has a binary coding indicating a verify message. In the event that the field so indicates a verify coding, the processor proceeds to a step 120 and inquires whether the field set aside in the message for DESTN_ADDR equals the particular device address assigned to the particular HVAC device. In the event that the DESTN_ADDR is for instance a one, the processor 46 within the HVAC device 12 would proceed along the yes path to a step 122. Referring to step 122, a TIMEOUT variable is set equal to the value of the CNFG_TIME field of the downloaded message. It will be remembered that this value is zero in the message sent by the network control device 10. The processor next will also set the CO_CNFG variable equal to the value of the field in the downloaded message set aside for CHECK_CNFG. It will be remembered that this value is true in the verify message transmitted by the network control device 10. The processor 46 proceeds from step 122 to a step 124 and initiates a one second timer clock. The processor proceeds to a step 126 and reads the one second timer clock and inquires as to whether one second has elapsed in step 128. In the event that one second has elapsed, the processor 46 proceeds to a step 130 and increments the value of the TIMEOUT variable by one. It will be remembered that the TIMEOUT variable is set equal to zero in step 122 when a verify message has been received. This will prompt the TIMEOUT variable to initially be set equal to one in step 130. The processor next proceeds to a step 132 and resets the one second timer clock before proceeding to step 134 to inquire as to whether the TIMEOUT value is greater than ten. Referring to step 128, in the event that the one second timer clock has not elapsed, the processor will also proceed to step 134. If the TIMEOUT variable is equal to ten or less, the processor will proceed along the no path out of step 134 to a step 136 and inquire whether the DO_CNFG variable is true. Since the DO_CNFG variable will have been set equal to true in step 122, the processor will proceed along the yes path to a step 138. Referring to step 138, the processor is operative to initiate an LED routine. This routine will preferably send signals each one-half second to the respective LED panel associated with the processor executing the process of FIGS. 5A and 5B. In the case of the processor 46, the routine will cause the LED panel 32 to blink or flash every one-half second. This blinking or flashing of the LED panel in response to the LED routine initiated in step 138 will continue until such time as terminated. The processor will proceed from initiating the LED routine in step 138 to an exit step 140. It is to be appreciated that the processor executing the particular software program of FIGS. 5A and 5B will execute various other programs normally performed by the processor for the particular HVAC device. This would, for instance, include the checking and monitoring of the HVAC control circuit for the device. Following completion of such other software programs, the processor will proceed to the entry step 142 in FIG. 5A and again check the message buffer for any new messages. Assuming that no new message has been received, the processor will proceed to step 126 and read the one second timer clock. In the event that one second has elapsed, the processor will proceed to increment the value of the TIMEOUT variable in step 130 and reset the one second timer clock once again in step 132. The processor will proceed to inquire as to whether the TIMEOUT variable is greater than ten in step 134. In the event that the TIMEOUT variable is ten or less, the processor will proceed to set the DO_CNFG variable equal to true in step 136 before again initiating the LED routine 138 and exiting in step 140. It is to be appreciated that this step of again initiating the LED routine will have no effect on an LED routine that is already activated.

Referring again to the entry step 142, it is to be appreciated that steps 112 through 128 will at some time result in the TIMEOUT variable being incremented to a value greater than ten. At this point, the processor will note in step 134 that the TIMEOUT variable is greater than ten thus prompting the processor to set the DO_CNFG variable equal to false in step 142. The processor now proceeds through step 136 and exits along the no path to a step 144, which terminates the LED routine. This will cause the processor 46 to, for instance, terminate any further flashing or blinking of the LED panel 32. The processor proceeds to the exit step 140 following termination of the LED routine.

It is to be appreciated from the above that the LED routine initiated in step 138 will be terminated at the expiration of a ten second TIMEOUT period unless the particular processor in the HVAC device has received another verification message from the network control device 10. Referring to the process of FIGS. 4A through 4C executed by the network control device 10, it is to be noted that a verification message will normally be sent to each HVAC device as a result of the processor proceeding through step 56 to steps 66, 68 and 70 when the processor 40 is in a configuration mode. It is to be appreciated that the execution of the steps 56, 66, 68 and 70 will occur frequently so as to result in a frequent sending of a verify message to the various HVAC devices well within the ten second time interval allocated in the respective HVAC devices for receipt of a new message before terminating the LED display. In this manner, it is only after the network control device 10 ceases sending a verify message earmarked for a particular zone that the LED routine activated in any HVAC device of that zone will be terminated ten seconds after receipt of the most recently received verify message.

It is also to be appreciated from the above that the network control device 10 is operative to send appropriate verification messages to a prescribed zone of HVAC devices connected to the communication bus 24. The resulting verification message will be sent on a timely basis to each such HVAC control device so as to allow the HVAC control device to continuously trigger the flashing or blinking of an LED display until such time as a different zone has been selected or a decision has been made to exit the configuration process. The transmittal of a verification message will also cease in the event that the next zone button 38 has not been depressed within one hour. This will result in the LED display of an HVAC device possibly flashing continuously for a maximum of one hour. This will allow a person wishing to check the individual HVAC devices at their respective locations up to one hour to confirm appropriately flashing LED panels. Any HVAC devices in a zone that are not flashing will be thereafter physically checked to ascertain why their LED panels are not flashing. This physical check will include, for instance, a checking of the two wire connections to the communication bus 24 to ascertain whether any of these connections have been transposed.

It is finally to be appreciated from the above that a particular embodiment of the invention has been described. Alterations, modifications and improvements thereto by those skilled in the art are intended to be a part of this disclosure even though not expressly stated herein and are intended to be within the scope of the invention. Accordingly, the foregoing description is by way of example only and the invention is to be limited only by the following claims and equivalents thereto.

What is claimed is:

1. A process for verifying the operability of at least one HVAC device in a communication network, said process comprising the steps of:

sending a message from a network control device to the HVAC device, the message including information for prompting the HVAC device to initiate a visible display on the HVAC device if the message is successfully processed by the HVAC device;

receiving, at the HVAC device the message from the network control device and thereafter processing the information for prompting the HVAC device to initiate a visible display; and automatically initiating a visible display on the HVAC device when the message is received and processed by the HVAC device whereby the visible display may be easily observed by a person wishing to check the physical location where the HVAC device has been installed.

2. The process of claim 1 wherein said step of sending a message from the network control device comprises:

noting within the network control device when an election has been made to send the message; and repetitively transmitting the message to the HVAC device until such time as an election has been made to terminate transmission of the message.

3. The process of claim 2 wherein said step of noting when an election has been made to send the message comprises the step of:

noting the status of a circuit in the network control device which indicates whether a button has been depressed or released on the network control device.

4. The process of claim 2 wherein said step of repetitively transmitting the message to the HVAC device until such time as an election has been made to terminate the message comprises the steps of:

noting the status of a circuit in the network control device which indicates whether a button has been depressed or released on the network control device;

terminating the repetitive transmission of the message when the status of the circuit indicates that the button has been depressed or released.

5. The process of claim 4 further comprising the steps of:

terminating the repetitive transmission of the message to the HVAC device after a predetermined period of time has expired following the initial transmittal of the message from the network control device.

6. The process of claim 2 wherein said step of initiating a visible display on the HVAC device comprises:

automatically initiating a visual display following the processing of the message from the network control device; and setting a predetermined period of visual display time during which the visual display will continue to occur without receipt of a further transmitted message from the network control device wherein the predetermined period of visual display time is greater than the maximum period which may elapse between repetitive transmissions of the message from the network control device.

7. The process of claim 6 wherein said step of initiating a visual display comprises the step of:

intermittently triggering the flashing of a panel of light emitting diodes on the HVAC device so as to produce a visible blinking of the panel of light emitting diodes.

8. The process of claim 1 wherein said step of automatically initiating a visible display on the HVAC device comprises:

automatically initiating a visual display following the processing of the message from the network control device; and setting a predetermined period of visual display time during which the visual display will continue to occur without receipt of a further message from the network control device.

9. The process of claim 8 wherein said step of automatically initiating a visual display comprises the step of:

intermittently triggering the flashing of a panel of light emitting diodes on the HVAC device so as to produce a visible blinking of the panel of light emitting diodes.

10. The process of claim 1 wherein the message sent by the network control device includes a particular identification as to the type of message being sent and wherein said step of receiving, at the HVAC device, the message from the network control device and thereafter processing the information for prompting the HVAC device to initiate a visible display comprises the steps of:

receiving the message at the HVAC control device; and checking the received message for the particular identification as to type of message;

whereby a visual display is initiated only when the received message contains the particular identification as to type of message.

11. A process for verifying the operability of HVAC devices grouped into individually identifiable zones of HVAC devices, each HVAC device having a display panel associated therewith, said process comprising the steps of sending a message from a network control device to the HVAC devices, the message including an identification of only one of the particularly identified zones; and automatically initiating a visible display on each display panel associated with each HVAC device in the particularly identified zone that receives the message from the network control device whereby the visible display on each display panel of each such HVAC device may be viewed by any person checking the physical locations of each HVAC device in the particularly identified zone.

12. The process of claim 11 wherein said step of sending a message from the network control device comprises:

noting within the network control device when an election has been made to send the message; and repetitively transmitting the message to the HVAC devices until such time as an election has been made to terminate transmission of the message.

13. The process of claim 12 wherein said step of noting when an election has been made to send the message comprises the step of:

noting the status of a circuit in the network control device which indicates whether a button has been depressed or released on the network control device.

14. The process of claim 12 wherein said step of repetitively transmitting the message to the HVAC device until such time as an election has been made to terminate the message comprises the steps of:

noting the status of a circuit in the network control device which indicates whether a button has been depressed or released on the network control device;

terminating the repetitive transmission of the message when the status of the circuit indicates that the button has been depressed or released.

15. The process of claim 14 further comprising the step of:

terminating the repetitive transmission of the message to the HVAC devices after a predetermined period of time has expired following the initial transmittal of the message from the network control device.

16. The process of claim 12 wherein said step of initiating a visual display on a display panel associated with each HVAC device of the particularly identified zone that receives the message comprises the steps of:

setting a predetermined period of visual display time during which the visual display will continue to occur without receipt of a further transmitted message from the network control device wherein the predetermined period of visual display time is greater than the maximum period which may elapse between repetitive transmissions of the message from the network control device.

17. The process of claim 14 wherein said step of automatically initiating a visual display comprises the step of:

intermittently triggering the flashing of a panel of light emitting diodes on each HVAC device so as to produce a visible blinking of the panel of light emitting diodes.

18. The process of claim 11 wherein said step of automatically initiating a visual display on a display panel associated with each HVAC device of the particularly identified zone that receives the message comprises:

setting a predetermined period of visual display time during which the visual display will continue to occur without receipt of a further message from the network control device.

19. The process of claim 18 wherein said step of automatically initiating a visual display comprises the step of:

intermittently triggering the flashing of a panel of light emitting diodes on each HVAC device so as to produce a visible blinking of the panel of light emitting diodes on each HVAC device.

20. The process of claim 11 wherein the message sent by the network control device includes a particular identification as to type of message being sent and wherein said step of automatically initiating a visible display on each display panel associated with each HVAC device when the message is received and processed by the HVAC device comprises the steps of:

receiving the message at the HVAC control device;

checking the received message for the particular identification as to type of message; and initiating a visual display only when the received message contains the particular identification as to type of message.

21. A system for verifying the operability of a plurality of HVAC devices in communication with at least one control device, said system comprising:

a processor within said control device which sends a message to each of said plurality of HVAC devices, the message including information that will prompt each HVAC device to initiate a visible display if the message is successfully processed by the HVAC device; and a plurality of HVAC device processors for processing the message received from said control device, each of said HVAC device processors including means for automatically initiating a visible display on a display panel associated with the HVAC device processor in response to a reading of the information in the message.

22. The system of claim 21 wherein said processor within said control device comprises:

means for noting when an election has been made to send the message; and means for repetitively transmitting the message to the HVAC device until such time as an election has been made to terminate transmission of the message.

23. The system of claim 22 wherein said means for noting when an election has been made to send the message comprises:

means for noting the status of a circuit in the control device which indicates whether a button has been depressed or released on the control device.

24. The system of claim 23 wherein said means for repetitively transmitting the message to the HVAC device until such time as an election has been made to terminate the message comprises:

means for noting the status of a circuit in the control device which indicates whether a button has been depressed or released on the control device; and means for terminating the repetitive transmission of the message when the status of the circuit indicates that the button has been depressed or released.

25. The system of claim 24 wherein said processor within said control device further comprises:

means for terminating the repetitive transmission of the message to the HVAC devices after a predetermined period of time has expired following the initial transmittal of the message to the HVAC devices.

26. The system of claim 22 wherein each HVAC device processor further comprises:

means for setting a predetermined period of time during which the visual display will continue to occur on the display panel associated with the HVAC device processor without the HVAC device having received any further repetitively transmitted messages from said control device.

27. The system of claim 26 where the display panels associated with each of said plurality of HVAC device processors is a panel of light emitting diodes and said means for initiating a visible display on the display panels comprises:

mean for intermittently triggering the flashing of said panel of light emitting diodes so as to produce a visible blinking of the panel of light emitting diodes.

28. The system of claim 21 wherein each HVAC device processor further comprises:

means for setting a predetermined period of time during which the visual display will continue to occur on the display panel associated with the respective HVAC device processor; and means for terminating the visual display on the display panel if a further message has not been received from the control device before the predetermined period of time elapses.

29. The system of claim 28 wherein the display panels associated with each of said plurality of HVAC device processor is a panel of light emitting diodes and said means for automatically initiating a visible display on the display panels comprises:

means for intermittently triggering the visible blinking of said panel of light emitting diodes.

30. The system of claim 21 wherein the message sent by said processor within said control device includes an identification of the particular type of message being sent and wherein each of said means for automatically initiating visible displays on display panels associated with each of said plurality of HVAC device processors comprises:

means for noting whether a message received from the control device contains the identification of the particular type of message; and means for initiating a visual display on the display panel associated with the HVAC device processor when the received message contains the identification of the particular type of message.

* * * * *